Patented Dec. 11, 1934

1,984,316

UNITED STATES PATENT OFFICE 1,984,316

STRIKING MATERIAL FOR MATCHES

Rodney S. Pullen, Akron, Ohio, assignor to Pullenlite Company, Philadelphia, Pa., a corporation of Pennsylvania No Drawing. Application October 19, 1931, Serial No. 569,854

8 Claims. (Cl. 52—28)

My invention relates to a striking material to be applied as a paint for use when dry in striking safety matches and more particularly to a paint of the character indicated including nitrocellulose and red phosphorus dissolved in acetone or a mixture of acetone and other solvents.

A purpose of my invention is to incorporate ferrous sulphate in a paint of the character indicated to improve the striking and ignition characteristics thereof when dry.

A further purpose is to incorporate either rosin or shellac and preferably both in a paint of the character indicated, preferably also incorporating ferrous sulphate in the paint.

A further purpose is to correct the tendency for a paint of the character indicated to turn white or "blush" during the artificial drying of the paint, a tendency probably usually incident to moisture coming into contact with acetone and any cotton dope of the mix.

Further purposes will appear in the specification and in the claims.

Paint, comprising nitrocellulose and a small amount of red phosphorus in suitable solvents such as acetone or a mixture of acetone and other solvents with or without an addition of a small amount of abrasives have been found to provide when dry very excellent coatings for striking safety matches, coatings in many ways superior to those hitherto in general use but nevertheless these paints have had undesirable characteristics which it is the object of the present invention to correct.

I have found that the striking and ignition characteristics of coatings of dried paint of the character indicated are much improved if the paint has been thickened with ferrous sulphate, and more particularly so if rosin or shellac or preferably both rosin and shellac have been also added. The coating is thicker and the ignition desirably retarded when the ferrous sulphate has been incorporated in the paint and the rosin or/and shellac make the dried coating tougher and more resistant to change whether chemical—such as by oxidation—or abrasion at each match striking upon the coating.

Extreme care in the past has had to be taken when artificially drying paint coatings of the character indicated, particularly for rapid drying in order to avoid what is called "blushing", a white blistering during artificial drying. "Blushing" appears to have been usually due to moisture coming into contact with the acetone and nitrocellulose of the paint.

I have found incorporating either shellac or rosin in a paint of the character indicated greatly reduces its tendency to "blush" in rapid drying and that the incorporation of both shellac and rosin appears to effect a far greater improvement than can be effected by either one alone.

Thus for a given total addition of shellac and rosin the characteristics of the dried coating are much better if the addition has included both shellac and rosin than when it has shellac and no rosin or rosin and no shellac.

The presence of rosin or/and shellac makes the coating of the dried paint tougher and less subject to chemical or mechanical change during each match striking upon its surface. This means that the same coating can be used for a materially greater number of match strikings than is possible when the shellac or rosin or both have not been incorporated in the paint.

An example of a suitable paint comprises a mixture of nitro-cellulose solution, acetone, suitably mixed with other solvent, amorphous phosphorus, ferrous sulphate, shellac or/and rosin and optionally powdered glass. For example excellent results have been obtained with the following mixture:—

| | Ounces |
|---|---|
| Celluloid | 1 to 2 |
| Dissolved in acetone | 16 |
| Amorphous phosphorus | 1½ |
| Ferrous sulphate | 1½ |
| Shellac | ¼ |
| Rosin, and optionally | ¼ |
| An abrasive, such as powdered glass | 1 |

The part of the above formula represented by 1 to 2 ozs. of celluloid may be substituted by a nitrocellulose composition in any one of a variety of solvents of which many are known to the trade. For instance it may be dissolved in ether, amyl acetate, acetone, benzol or toluol and the solution may be used directly in place of the celluloid dissolved in acetone in the above formula, provided the strength of the solutin, i. e., the thickness or viscosity may be correct. If not, if it to too thick, it is the custom to use in the trade, a so-called "thinner", of which many are on the market. One satisfactory "thinner" is known to the trade as "No. 3132 thinner," and comprises ethyl acetate and toluol.

In place of the solution of celluloid in acetone may be used for example, a solution of cellulose, known in the trade as "16 oz. cotton dope". With this use it is desirable to use some acetone and in that event, the formula above becomes:

| | Ounces |
|---|---|
| "16 oz. cotton dope" | 8½ |
| Acetone | 12 |
| "No. 3132 thinner" comprising ethyl acetate and toluol | 4 |
| Amorphous phosphorus | 1½ |
| Ferrous sulphate | 1½ |
| Shellac | ¼ |
| Rosin, and optionally | ¼ |
| An abrasive, such as powdered glass | 1 |

The "thinner" may be replaced by a corresponding amount of acetone.

The suggested formulæ above are suggested by way of example only as forms which will operate successfully, but are not intended to restrict the invention to any such limitations.

The use of the "thinner" is chiefly to secure quick drying and is not essential to securing practical results. The proportions in either formula as well as the character of solvent used may be varied considerably without losing the benefit of my invention.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent:—

1. A match abrasive paint containing nitrocellulose, red phosphorus, a solvent, and incorporating ferrous sulphate.

2. A match abrasive paint containing nitrocellulose, red phosphorus, a solvent and incorporating ferrous sulphate and a small amount of shellac.

3. A match abrasive paint containing nitrocellulose, red phosphorus, a solvent and incorporating ferrous sulphate and a small amount of rosin.

4. A match abrasive paint containing nitrocellulose, red phosphorus, a solvent and incorporating ferrous sulphate and small amounts of both shellac and rosin.

5. A paint of the character indicated containing cotton dope, a solvent, amorphous phosphorus, ferrous sulphate and a toughener ingredient in approximate proportions 8½ oz. cotton dope, 16 oz. solvent, 1½ oz. amorphous phosphorus, 1½ oz. ferrous sulphate, ½ oz. toughener ingredient, the said solvent including approximately 12 oz. of acetone and the toughener including one of the substances of the group shellac and rosin.

6. A paint of the character indicated containing cotton dope, a solvent, amorphous phosphorus, ferrous sulphate and a toughener ingredient in approximate proportions 8½ oz. cotton dope, 16 oz. solvent, 1½ oz. amorphous phosphorus, 1½ oz. ferrous sulphate, ½ oz. toughener ingredient, the said solvent including approximately 12 oz. of acetone and 4 oz. of a mixture of ethyl acetate and toluol and the toughener including one of the substances of the group shellac and rosin.

7. A paint of the character indicated containing nitrocellulose, dissolved in acetone, amorphous phosphorus, ferrous sulphate, and one of the substances of the group shellac and rosin.

8. A paint of the character indicated containing nitrocellulose, dissolved in acetone, amorphous phosphorus, ferrous sulphate, and a mechanical abrasive.

RODNEY S. PULLEN.